July 31, 1951

F. W. ROBERTS ET AL

METHOD OF MAKING SEALED ELECTROMECHANICAL TRANSLATING DEVICES

Filed Feb. 13, 1947

2,562,741

INVENTORS.
FREDERICK W. ROBERTS
JOHN A. DUNTZE
BY
Blair, Curtis & Hayward
ATTORNEYS.

Patented July 31, 1951

2,562,741

UNITED STATES PATENT OFFICE 2,562,741

METHOD OF MAKING SEALED ELECTRO-MECHANICAL TRANSLATING DEVICES

Frederick W. Roberts, Fairfield, and John A. Duntze, East Norwalk, Conn., assignors to Dictaphone Corporation, New York, N. Y., a corporation of New York Application February 13, 1947, Serial No. 728,284

4 Claims. (Cl. 117—48)

This invention relates to an electro-mechanical vibration translating device and to a method of protecting the interiors of translating and like devices against the entrance of foreign matter such as moisture. More particularly it pertains to a sealed piezoelectric translating device for sound recording or reproducing.

Heretofore various methods have been suggested for protecting piezoelectric crystals and other similar components against deleterious foreign matter, particularly moisture. Thus, it is well-known to wrap such crystals in waxed paper, metal foil, or other relatively impervious materials and to cover them with wax, pitch, and suitable plastics. In general, such protected crystals have been limited in their applications to those wherein the crystal was connected in a circuit to serve as a frequency control element with no mechanical connections being made thereto. Some such frequency controlling components have even been molded within casings formed of phenolic resins and other plastics, with the leads projecting through the molded casing.

When a crystal is to be used in a phonograph recorder or reproducer it must be mechanically connected to a stylus and such stylus must, of course, be free to follow the sound vibrations being translated and to relay them to and from the crystal. Accordingly, the common expedients for sealing frequency controlling crystals against corrosive influences cannot be used, for the connection between the stylus and the crystal must remain mechanically free.

The problem is less serious in the relatively dry atmospheres which prevail throughout much of this country. In tropical climates the difficulties have been substantial. In the past no entirely satisfactory solution has been offered for preventing moisture sooner or later from destroying the crystal by working its way along the mechanical connecting means between stylus and crystal and through the opening in the crystal case through which the connecting means passes. We have devised a crystal sealing construction and method which leave the stylus free to follow the vibrations being translated but in which a barrier is presented against the entrance of moisture or foreign matter.

It is an object of our invention to provide methods of and means for sealing translating devices of the character described which methods and means have to a notable extent the characteristics and capabilities set forth. A further objective resides in the provision of such methods and means which are practicable and which overcome the disadvantages inherent in the methods and constructions heretofore known to the art. A further object is to provide a moisture-proof sound translating unit which is easy to manufacture in mass production, efficient in operation, and has a long life. Still a further object is to provide a commercially feasible method of protecting an ordinary vibration translating unit against corrosive atmospheric conditions and foreign matter. Other objects will be in part pointed out as the description proceeds and will in part become apparent therefrom.

The invention accordingly consists in the features of construction, combinations of elements, arrangements of parts and methods of operations as will be exemplified in the structures and sequences and series of steps to be hereinafter indicated and the scope of the application of which will be set forth in the claims.

In this specification and the accompanying drawings, we have shown and described a preferred embodiment of our invention and suggested various modifications thereof; but it is to be understood that these are not intended to be exhaustive nor limiting of the invention, but on the contrary are given for purposes of illustration in order that others skilled in the art may fully understand the invention and the principles thereof and the manner of applying it in practical use so that they may modify and adapt it in various forms, each as may be best suited to the conditions of a particular use.

Figures 1, 2, 3:
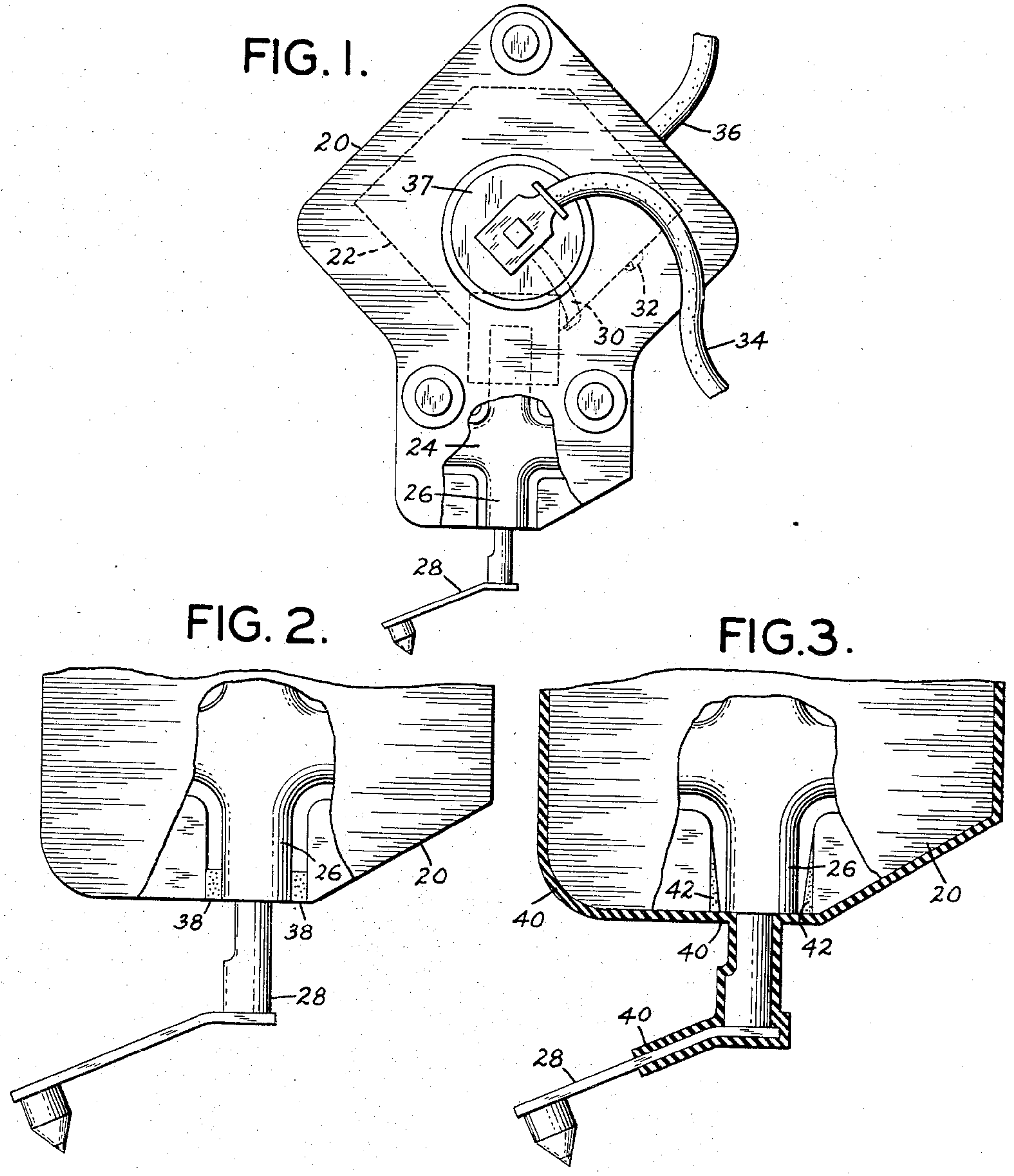
Figure 1 is a view, on an enlarged scale and with parts broken away, of a piezoelectric sound translating reproducer unit.
Figure 2 is a fragmentary view, on a larger scale, of a part of the unit shown in Figure 1 and showing a step in the process of sealing the head against moisture.
Figure 3 is a view similar to that of Figure 2 but illustrating a further step in the process; and, Figure 4 is a view of a sealed piezoelectric crystal.

The sound translating unit shown in Figure 1 includes a metal casing 20 which houses a piezoelectric crystal 22 conventionally associated with a pivot piece 24 carrying a stylus chuck 26. A stylus 28 is held within the chuck. Preferably this stylus is of the permanent sapphire type. The crystal is provided with a pair of metal foil leads 30 and 32 connected to exterior leads 34 and 36, respectively. As shown in Figure 1, lead 30 and exterior lead 34 are brought together and connected through a dielectric insert 37 set in and forming a part of casing 20. The outer end of metal foil lead 30 passes through and is supported by this insert where the connection is made with exterior lead 34, as is well known.

In a completed translating unit such as shown in Figure 1 no major problem is presented to sealing all parts of casing 20 against entrance of moisture except for that portion which affords clearance space around chuck 26. In order for the translating device to operate, chuck 26 must remain substantially unrestrained in movement so that the vibrations of the stylus may be mechanically transferred to the piezoelectric crystal. In the past various materials have been used to form a sealing plug between the chuck and the casing but no satisfactory plug has previously been found which did not also damp the sound vibrations to such an extent that the translating head was rendered ineffective. For example, when the head was dipped in rubber the dipping solution would run into the clearance space around the chuck and not only seal this space against entrance of moisture but also damp the vibratory stylus movements to such an extent as to render the head inoperative.

According to our invention the clearance space around the chuck is temporarily blocked as by a soft, low melting point wax plug 38 (see Figure 2) and thereafter the entire casing and the shank of stylus 28 are dipped in a rubber or elastomer dipping solution leaving a thin coating 40 in a continuous film covering the entire unit. Plug 38 prevents the dipping solution from entering the space between the chuck and the casing. Thereafter coating 40 may be vulcanized and during the vulcanizing process the casing is so positioned that when the wax melts it runs inwardly (see Figure 3) to form a wax film 42 covering interior portions of the translating head and leaving a very thin vulcanized film completely sealing the space between the stylus and the casing. Thus, the heating step not only vulcanizes the film but also melts the wax plug so that the film is released and the wax flows into waste space where it cannot interfere with the operation of the unit. Some satisfactory dipping solutions do not require vulcanizing with heat and if such a solution is used, the heating step need only be sufficient to melt away the wax plug. Preferably the elastomer solution in which the translating unit is dipped should have such low viscosity that only a thin coating will remain on the dipped unit and the solution should be one which in any event does not require extremely high vulcanizing temperatures. The resulting film 40 is so thin and resilient that it offers no material damping action to vibratory movements of the stylus. The stylus movements at most are slight, and any tensioning and compressing of the elastic film which theoretically would occur is of negligible proportions.

Obviously the ordinary Rochelle salt piezoelectric crystal should not be selected when our sealing process is to be used for such a crystal might be injured or even melted during the heating step. A crystal which will withstand wax melting temperatures must be employed. An ammonium dihydrogen phosphate piezoelectric crystal is one example of a crystal which will withstand successfully wax melting or vulcanizing temperatures. An ordinary Rochelle crystal will withstand the temperatures at which certain of the possible waxes melt.

It is important, of course, that the rubber or other elastomer should bond well to the metal casing and stylus shank. Otherwise moisture might creep up the stylus shank, for example, and thus obtain access to the crystal. In order to assure a good bond the units may first be dipped in any one of several good bonding cements now available.

Figure 4:
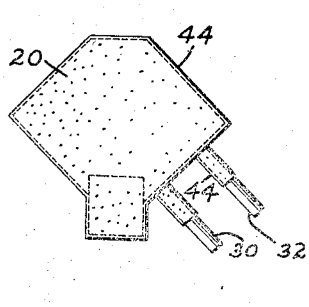

In Figure 4 we have shown a crystal which has been dipped in a latex solution and vulcanized. A film of rubber 44 covers the entire crystal and also the base of leads 30 and 32 where they extend from the crystal. Such a coated crystal may be clamped within a casing in the usual manner. The rubber film protects the crystal against moisture and does not interfere with normal operation. Here again the crystal selected for dipping must be of the high temperature type for successful vulcanization of the rubber coating.

From the foregoing it will be observed that a sealed translating construction embodying our invention is well adapted to attain the ends and objects hereinbefore set forth and to be economically manufactured and practiced, since the separate features are well suited to common production methods and are subject to a variety of modifications as may be desirable in adapting the invention to different applications.

Since many embodiments of the invention are possible and since many changes might be made in the embodiments set forth, protection is not to be limited to anything described or presented in the above specification and drawings but only to the scope of the hereinafter attached claims.

We claim:

1. In the art of rendering moistureproof a vibration translating unit, that improvement which includes the steps of: forcing a noncorrosive, inert, thermoplastic material having the physical properties of a soft, low melting point wax which will flow when molten into any openings in the casing of the unit through which moisture might enter, coating the casing with a noncorrosive, inert, flexible-film-forming, rubber-like compound, subjecting the unit to sufficient heat to melt the thermoplastic material, and flowing the melted thermoplastic material out of such openings and into the interior of the casing leaving behind it a flexible sealing film of the rubber-like compound.

2. In the art of sealing the opening between a translating unit casing and a stylus shank, that improvement which includes the steps of: blocking the opening with a noncorrosive, inert, thermoplastic material having the physical properties of a soft, low melting point wax which will flow when molten, covering the blocked opening and adjacent stylus shank and casing portions with a thin coating of noncorrosive, inert, flexible-film-forming, rubber-like compound, subjecting the parts to heat sufficient to melt the thermoplastic material, and flowing the molten material from the opening thus leaving a flexible sealing skin of the rubber-like compound extending across said opening.

3. In the art of manufacturing a sealed vibration translating unit, that improvement which includes the steps of: placing a noncorrosive, inert, thermoplastic barrier having the physical properties of a soft, low melting point wax which will flow when molten across an opening in the unit through which mechanical motion is transferred, dipping the unit into a noncorrosive, inert, rubber-like dipping solution having the property of forming an adherent, thin, flexible coating, and removing said barrier by subjecting the dipped unit to heat sufficient to melt the material of said barrier and flowing the molten material of said barrier out of said opening.

4. In the art of manufacturing a sealed vibration translating unit, that improvement which includes the steps of: disposing the shank of a stylus means through a free opening in a wall of said unit, plugging the clearance space between the shank of the stylus means and the adjacent wall of said unit with a noncorrosive, inert, thermoplastic material having the physical properties of a soft, low melting point wax which will flow when molten, dipping the unit and the shank of the stylus means into a noncorrosive, inert, rubber-like dipping solution having the property of forming an adherent, thin, flexible coating, and melting the plug of thermoplastic material by subjecting the dipped unit to heat and flowing the molten material away from the stylus means shank.

FREDERICK W. ROBERTS.
JOHN A. DUNTZE.

REFERENCES CITED

The following references are of record in the file of this patent:

UNITED STATES PATENTS

| Number | Name | Date |
|---|---|---|
| 519,438 | Smith | May 8, 1894 |
| 766,506 | Lapp | Aug. 2, 1904 |
| 1,187,746 | Kirchen Bauer | June 20, 1916 |
| 1,857,476 | Reynolds | May 10, 1932 |
| 2,054,699 | Geyer | Sept. 15, 1936 |
| 2,108,017 | Lithgow | Feb. 8, 1938 |
| 2,147,620 | Winkelmann | Feb. 14, 1939 |
| 2,160,793 | Dally | May 30, 1939 |
| 2,313,129 | Dohan | Mar. 9, 1943 |
| 2,324,024 | Ream | July 13, 1943 |
| 2,326,460 | Hasbrouck | Aug. 10, 1943 |
| 2,348,919 | Milton | May 16, 1944 |
| 2,429,897 | Saunders | Oct. 28, 1947 |
| 2,462,899 | Riecken | Mar. 1, 1949 |